UNITED STATES PATENT OFFICE.

AUGUSTUS O. BOURN, OF BRISTOL, RHODE ISLAND.

PROCESS OF TREATING FIBROUS RUBBER WASTE FOR THE RECOVERY OF THE RUBBER OR CAOUTCHOUC THEREFROM.

SPECIFICATION forming part of Letters Patent No. 295,615, dated March 25, 1884.

Application filed February 25, 1884. (No specimens.)

*To all whom it may concern:*

Be it known that I, AUGUSTUS O. BOURN, of Bristol, in the county of Bristol and State of Rhode Island, have invented certain new and useful Improvements in the Process of Treating Fibrous Rubber Waste for the Recovery of the Rubber or Caoutchouc therefrom; and I do hereby declare that the following specification is a clear, true, and complete description of my invention.

In my Letters Patent No. 292,891, dated February 5, 1884, I disclosed a process for the elimination of cotton fiber from fibrous rubber waste, which consisted in the employment of such solutions of acid and water as will liquefy the fiber or change it into a body soluble in water, and leave the rubber practically intact. The only acid specifically referred to by me in said Letters Patent was sulphuric acid, although I at the time of filing my application for said patent was cognizant of the fact, as a matter of common knowledge, that either nitric acid or muriatic acid, or combinations of said acids, could be relied upon as an equivalent or substitute for sulphuric acid in rendering the cotton fiber soluble in water. I have within the past two years used both nitric acid and muriatic acid, and also combinations thereof, with good results; and the object of my present application is to secure to myself the full fruits of my original invention, should the Commissioner of Patents and the courts consider that the said nitric acid or said muriatic acid, or combinations or mixtures thereof, are not true equivalents of the sulphuric acid, as described and claimed in my said Letters Patent. As set forth in my said prior Letters Patent, I employ sulphuric-acid solutions containing about three or four per cent. of acid, and in accordance with my present application I employ solutions containing about three or four per cent. of either nitric acid or of muriatic acid, or of a compound of both acids.

With the solutions containing nitric acid or muriatic acid, or compounds of both acids, I proceed, as described in my said Letters Patent, to boil the fibrous rubber waste suitably prepared (preferably by chopping or grinding into small pieces,) in such solutions of said acids as will liquefy the fiber or change it into a body soluble in water and leave the rubber intact, said solutions containing, as before stated, about three or four per cent. of acid of commerce. The boiling operation is varied according to circumstances, good results being obtained by boiling the waste from fifteen to twenty-four hours. The fiber, having thus been rendered soluble, passes off with the solutions, and the rubber is then subjected to the cleansing and working operations common to the treatment of crude gum.

In the treatment of the rubber waste with solutions containing muriatic acid or nitric acid, or compounds of said acids, a little more of the mineral matters usually compounded with rubber and contained in rubber waste is naturally taken up and carried off in the solution than when sulphuric-acid solutions of the same strength are employed, because of the well-known differences in the general character of the acids; but as all of said mineral matter was originally intentionally incorporated with the rubber, it is seldom of consequence to eliminate any portion thereof from the rubber waste other than more or less of the volatile portions of the mineral matter which are eliminated during the usual devulcanizing operations to which the recovered rubber is generally subjected.

The use of either nitric acid or muriatic acid, or compounds thereof, is attended with slightly greater cost than when sulphuric acid of corresponding commercial grade is used; but this difference is seldom of sufficient consequence to constitute a practical consideration.

Having thus described my invention, I claim as new—

The process of treating rubber waste containing cotton fiber by subjecting said waste to the action of nitric acid or muriatic acid, or compounds of both of said acids, in solutions of sufficient strength to convert the fiber into soluble matter and enable its removal from the waste with the solution, substantially as described.

AUGUSTUS O. BOURN.

Witnesses:
GEORGE O. EDDY,
O. C. BARROWS.